United States Patent [19]
Shim et al.

[11] Patent Number: 5,840,817
[45] Date of Patent: Nov. 24, 1998

[54] POLYMER FOR PHOTO-CONDUCTIVE LAYER AND PREPARATION METHOD THEREOF

[75] Inventors: Jae-ho Shim, Seoul; Min-ho Kim, Suwon; Bong-mo Jeong, Seoul; Wan-woo Park, Yongin; Deuk-yong Yang, Suwon, all of Rep. of Korea

[73] Assignee: Samsung Display Devices Co., Ltd., Kyungki-Do, Rep. of Korea

[21] Appl. No.: 746,843

[22] Filed: Nov. 18, 1996

[30] Foreign Application Priority Data

Dec. 29, 1995 [KR] Rep. of Korea .................. 95-66820

[51] Int. Cl.⁶ .................................................. C08F 32/08
[52] U.S. Cl. .................... 526/284; 526/280; 526/286; 526/297; 526/300; 430/56
[58] Field of Search .................. 526/286, 284, 526/280, 297, 300; 430/56

[56] References Cited

U.S. PATENT DOCUMENTS 4,677,155  6/1987  Finter ...................................... 524/781

FOREIGN PATENT DOCUMENTS 4-338761  11/1992  Japan .
5-173341   7/1993  Japan .
5-173342   7/1993  Japan .

OTHER PUBLICATIONS

Reddy et al., J. Polym. Sci: Part A: Polym. Chem, 25, (1987) 2987–3003.

Reddy et al., J. Polym. Sci: Part A; Polym. Chem. 26, (1988) 1051–1061.

*Primary Examiner*—Fred Zitomer
*Attorney, Agent, or Firm*—Leydig, Voit & Mayer

[57] ABSTRACT

A polymer for a photo-conductive layer and a preparation method thereof is provided. The polymer is suitable for using as a charge transporting material for a photo-conductive layer owing to its excellent electron transporting capacity as well as high solubility to a solvent and good compatibility with the binder polymer.

13 Claims, 4 Drawing Sheets

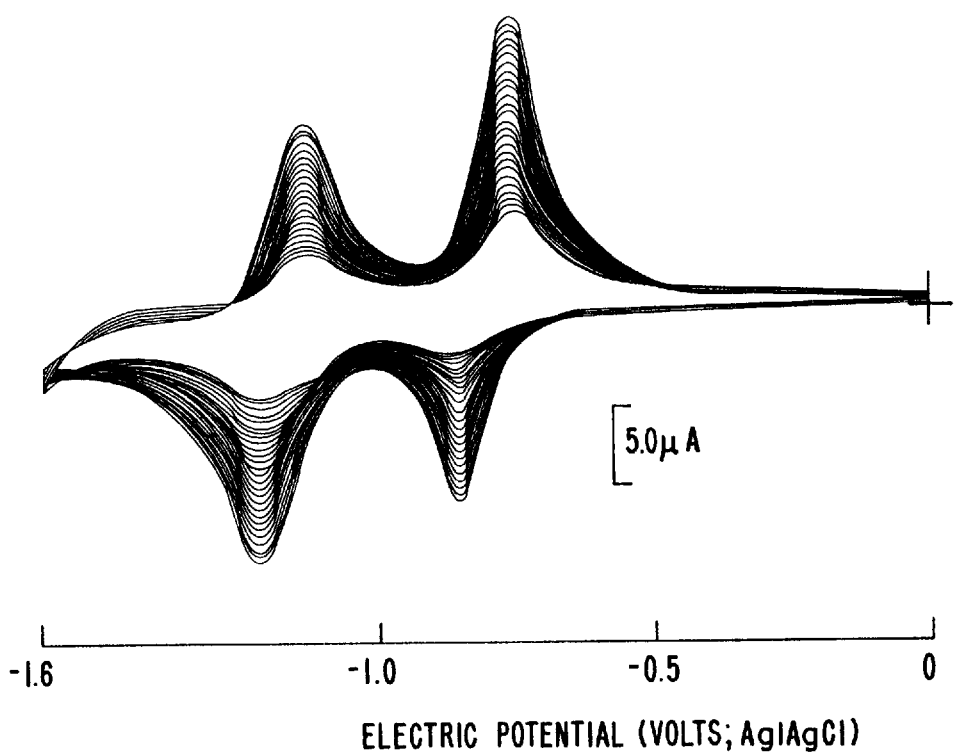
F I G. 5

POLYMER FOR PHOTO-CONDUCTIVE LAYER AND PREPARATION METHOD THEREOF

BACKGROUND OF THE INVENTION

The present invention relates to a polymer for a photo-conductive layer and a preparation method thereof. More particularly, the invention relates to a polymer for a photo-conductive layer which can be used-in the formation of a fluorescent screen by an electrophotographic technique, and to a preparation method thereof.

The fluorescent screen for a color cathode ray tube has a dot or stripe pattern of red, green and blue-emitting phosphors interleaved between a black matrix inside a panel. Such a fluorescent screen can be manufactured by using a slurry coating method or an electrophotographic technique.

In the formation of a fluorescent screen for a color cathode ray tube by using the slurry coating method, first, slurry is prepared which comprises red, green or blue-emitting phosphor, polyvinyl alcohol, and potassium dichromate. The obtained slurry is coated inside the panel on which the black matrix pattern is formed. Then, the resultant panel is dried, exposed to ultraviolet rays, and developed to form a phosphor pattern. The other two phosphor patterns are also formed by using the above-described process to complete the fluorescent screen.

The method of forming a fluorescent screen using phosphor slurry (hereinafter referred to as "slurry methods"), however, has problems. First, a color mixing problem arises when phosphor remaining on some non-exposed portions of the screen become mixed with the other phosphors. Secondly, colored material can be generated by the reaction between hydroxy groups of polyvinyl alcohol and potassium dichromate contained in the phosphor slurry. In such a case, the colors generated from each dot or stripe are not pure; that is, color purity is poor. In addition, such a slurry method is costly due to lengthy production times and can result in serious environmental contamination problems due to the potassium dichromate.

To overcome these problems, a method for forming a fluorescent screen exhibiting good contrast and brightness, by using the electrophotographic technique has been proposed.

The electrophotographic technique is a process adopting the photo-conductive phenomenon to form a fluorescent screen, which comprises forming a photo-conductive layer on the inner surface of the panel and then coating phosphors thereon. The photo-conductive layer comprises a charge generating material, a charge transporting material and a binding polymer.

Conventionally, inorganic materials are widely used as a charge transporting material in the photo-conductive layer. The inorganic materials have problems in that sensitivity, heat stability, moisture resistance, and durability are poor. Further, some inorganic materials are toxic to humans. To overcome such problems of the inorganic materials, organic photo-conductive materials are being studied extensively.

Such organic materials include hydrazone, trifluoroamine compound and derivatives thereof, and have a positive (hole) transporting capacity. When these materials are used, the surface of the photo-conductive layer should be negatively charged. In this case, ozone is generated in a huge quantity compared with positive charging.

To overcome the ozone generation problem, the surface of the photo-conductive layer should be positively charged. Therefore, a material having an electron transporting capacity has been actively studied. 2,4,7-trinitrofluorenone is known as an electron transporting material, but is unsuitable for the photo-conductive layer owing to its poor solubility and -poor compatibility with a polymeric binder. Further, 2,4,7-trinitrofluorenone is carcinogenic.

SUMMARY OF THE INVENTION

Therefore, it is an object of the present invention to provide a polymer for a photo-conductive layer exhibiting high solubility, good compatibility with a binder polymer and an excellent electron transporting capacity.

To achieve the above object, the present invention provides a polymer for a photo-conductive layer, having a weight average molecular weight of 160,000 to 240,000 and represented by formula (I):

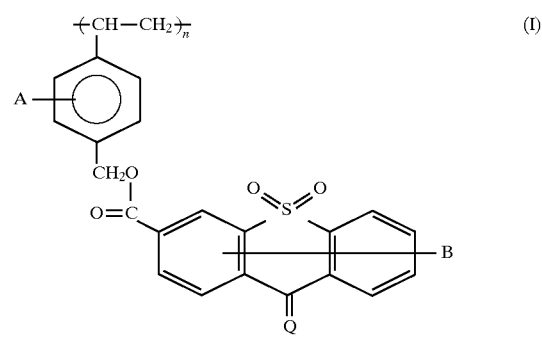

wherein A represents a hydrogen atom, a halogen atom, an alkyl group or an alkoxy group; B represents a hydrogen atom, a halogen atom, an alkyl group, an alkoxy group, a cyano group, a nitro group, an ester group or a trifluoromethyl group which is attached to one of the seven available aromatic carbons on the tricyclic ring, the remaining six aromatic carbons being unsubstituted; Q represents an oxygen atom, $C(CN)_2$, $C(CO_2R)_2$, $C(CN)CO_2R$, $C(CN)COR$, $C(CN)COAr$, NCN or NAr, where R represents an alkyl group or an aryl group and Ar represents an aryl group; and n is 400 to 600.

To achieve the above object, the present invention provides for a polymer comprising one kind of repeating unit represented by formula (II) and at least one kind of repeating unit selected from the group consisting of the following formulas (III), (IV), (V) and (VI), and having a weight average molecular weight of 80,000 to 500,000:

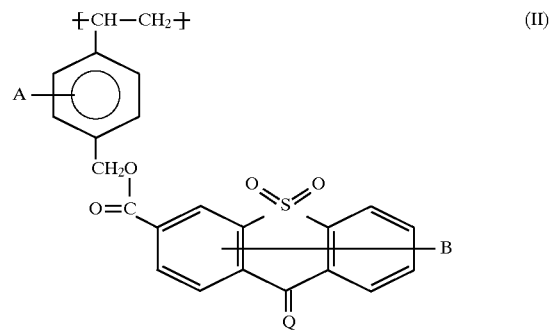

$$+CH-CH_2+ \quad (III)$$
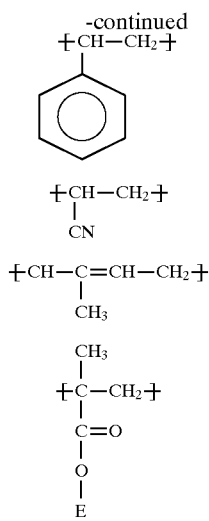

$$+CH-CH_2+ \quad (IV)$$
$$\quad\quad |$$
$$\quad\quad CN$$

$$+CH-C=CH-CH_2+ \quad (V)$$
$$\quad\quad\quad |$$
$$\quad\quad\quad CH_3$$

$$\quad\quad CH_3 \quad\quad (VI)$$
$$\quad\quad\ |$$
$$+C-CH_2+$$
$$\ |$$
$$\ C=O$$
$$\ |$$
$$\ O$$
$$\ |$$
$$\ E$$

wherein, in formula (II), A represents a hydrogen atom, a halogen atom, an alkyl group or an alkoxy group; B represents a hydrogen atom, a halogen atom, an alkyl group, an alkoxy group, a cyano group, a nitro group, an ester group or a trifluoromethyl group as defined above; and Q represents an oxygen atom, $C(CN)_2$, $C(CO_2R)_2$, $C(CN)CO_2R$, $C(CN)COR$, $C(CN)COAr$, NCN or NAr, where R represents an alkyl group or an aryl group and Ar represents an aryl group; and, in formula (VI), E represents an alkyl group.

Another object of the present invention is to provide for a preparation method of the above polymer.

To achieve the above object, the present invention provides for a preparation method of a polymer for a photoconductive layer comprising the steps of: adding a thioxanthene derivative represented by formula (VII) and a styrene derivative represented by formula (VIII) to a first organic solvent in the same molar amount, adding an acid scavenger, and then reacting the reaction mixture, to thereby prepare a monomer represented by (IX);

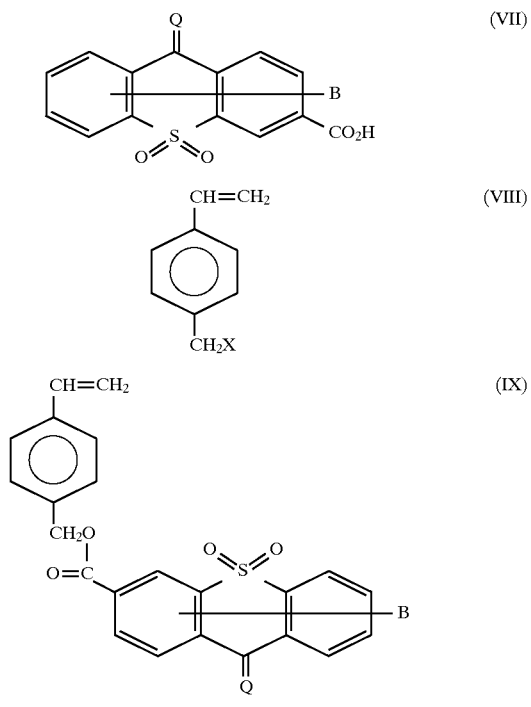

wherein A represents a hydrogen atom, a halogen atom, an alkyl group or an alkoxy group; B represents a hydrogen atom, a halogen atom, an alkyl group, an alkoxy group, a cyano group, a nitro group, an ester group or a trifluoromethyl group as defined above; and Q represents an oxygen atom, $C(CN)_2$, $C(CO_2R)_2$, $C(CN)CO_2R$, $C(CN)COR$, $C(CN)COAr$, NCN or NAr, where R represents an alkyl group or an aryl group and Ar represents an aryl group; and adding the monomer into a second organic solvent and then adding a polymerization initiator, to thereby polymerize the monomer.

In particular, it is preferred that at least one kind of monomer selected from the group consisting of styrene, acrylonitrile, isoprene, acrylic ester and methacrylic ester is further added to the second organic solvent in an amount of 1 to 2 mole %, based on the monomer represented by formula (IX).

BRIEF DESCRIPTION OF THE DRAWING

The above objects and advantages of the present invention will become more apparent by describing in detail a preferred embodiment thereof with reference to the attached drawings in which:

FIG. 5 is a cyclic voltammogram showing redox behavior of the polymer represented in FIG. 3.

DETAILED DESCRIPTION OF THE INVENTION

Figure 1:
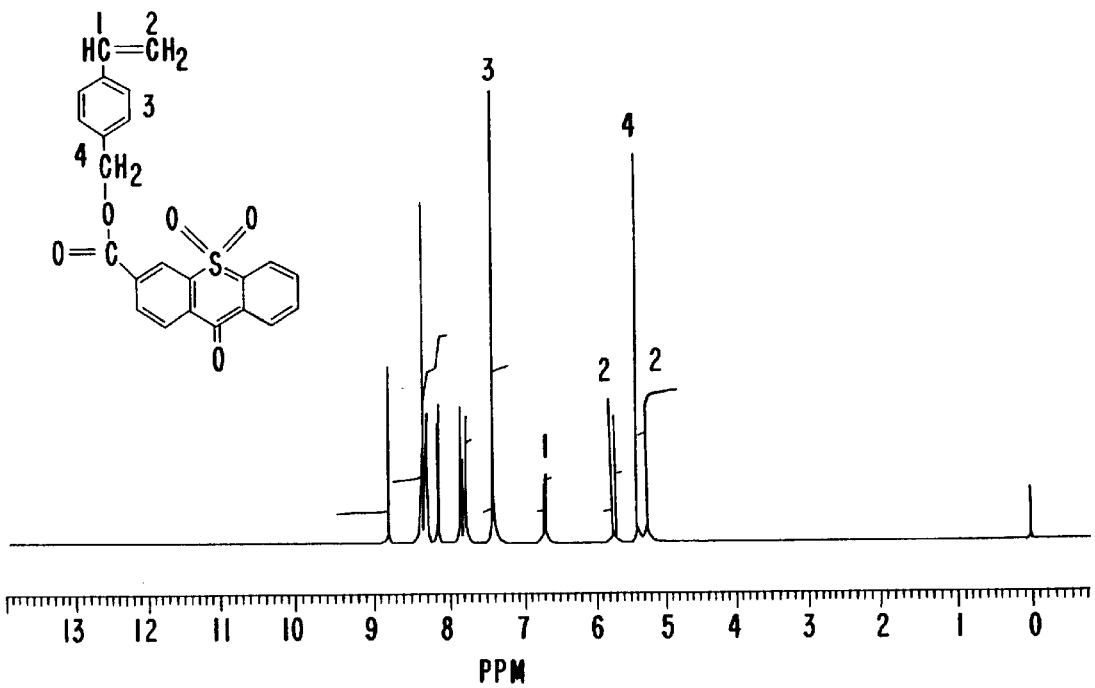
FIG. 1 is a $^1$H-NMR spectrum of a thioxanthene derivative according to one embodiment of the present invention.

Hereinafter, the present invention will be described with reference to the preparation processes of the polymer for a photo-conductive layer, in detail.

Synthesis of Monomer

First, thioxanthene derivative represented by formula (VII) and styrene derivative represented by formula (VIII) are added to an organic solvent in the same molar amount, and an acid scavenger is added thereto. Thereafter, the mixture is left for reaction, to give a monomer represented by formula (IX).

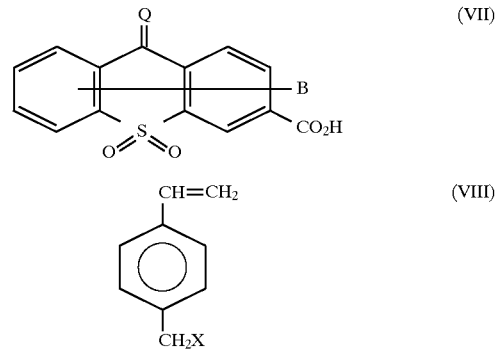

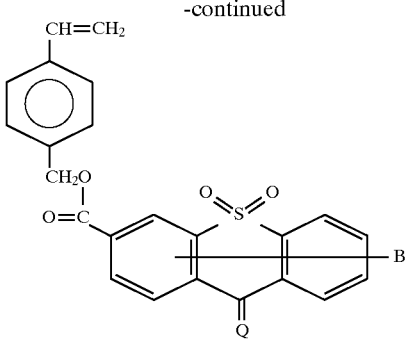

(IX)

Here, A represents a hydrogen atom, a halogen atom, an alkyl group or an alkoxy group; B represents a hydrogen atom, a halogen atom, an alkyl group, an alkoxy group, a cyano group, a nitro group, an ester group or a trifluoromethyl group as defined above; and Q represents an oxygen atom, $C(CN)_2$, $C(CO_2R)_2$, $C(CN)CO_2R$, $C(CN)COR$, $C(CN)COAr$, NCN or NAr (where R represents an alkyl group or an aryl group, and Ar represents an aryl group).

Preferably, dimethylformamide is used as the organic solvent and sodium hydrogen carbonate is used as the acid scavenger. The reaction is continued for 24–48 hours at a temperature of 40°–50° C.

Synthesis of Polymer

The monomer obtained in the previous step is added to an organic solvent such as tetrahydrofuran (THF), and the polymerization initiator is then added to initiate the polymerization reaction. As a result, a polymer represented by formula (I) is synthesized.

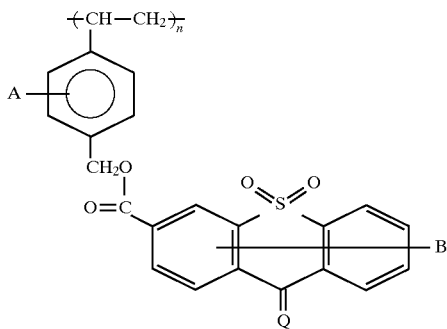

(I)

Here, A, B, Q, R and Ar have the same definitions as above.

The polymerization reaction continues for 24–48 hours at a temperature of 70°–80° C.

In particular, it is preferred that at least one monomer selected from the group consisting of styrene, acrylonitrile, isoprene, acrylic ester and methacrylic ester is further added to the above reaction solution in an amount of 1–2 mole %, based on the monomer represented by formula (IX).

The polymer synthesized according to the present invention can be applied to several kinds of films requiring an electron transporting capacity. For instance, the polymer of the present invention can be used as a common charge transporting material to form a positively chargeable photoconductive layer. Also, the polymer may be used as a protective layer for the photo-conductive layer or as a lower layer of the charge generation layer to increase photosensitivity.

The polymer according to the present invention can be mixed with a small amount of electron-receiving material such as trinitrofluorenone, benzoquinone derivative or anthraquinone derivative in order to make the electron transporting capacity even better.

Further, the polymer according to the present invention can be used as a mixture with another polymer such as polycarbonate, polystyrene, acrylic resin, methacrylic resin, epoxy resin, silicon resin or polyester, or as a copolymer therewith.

Hereinbelow, the present invention will be concretely explained with following examples, but it should be noted that the invention is not limited thereto.

EXAMPLE 1

3 g (10.4 mmol) of 9-oxo-10,10-dioxidethioxanthene-3-carboxylic acid, 1.75 g (20.8 mmol) of sodium hydrogen carbonate as an acid scavenger, 3.18 g of chloromethylstyrene and 70 ml of dimethylformamide (DMF) were mixed in a three neck flask, and then reacted for 48 hours at 40° C. After completing the reaction, the reaction mixture was poured into distilled water and stirred. Thereafter, organic phase was separated using ether. Finally, the organic phase was demoisturized using magnesium sulfate and organic solvent was then removed. The resultant was vacuum dried at 60° C. to yield 3.43 g of a product (yield: 82%).

Figure 2:
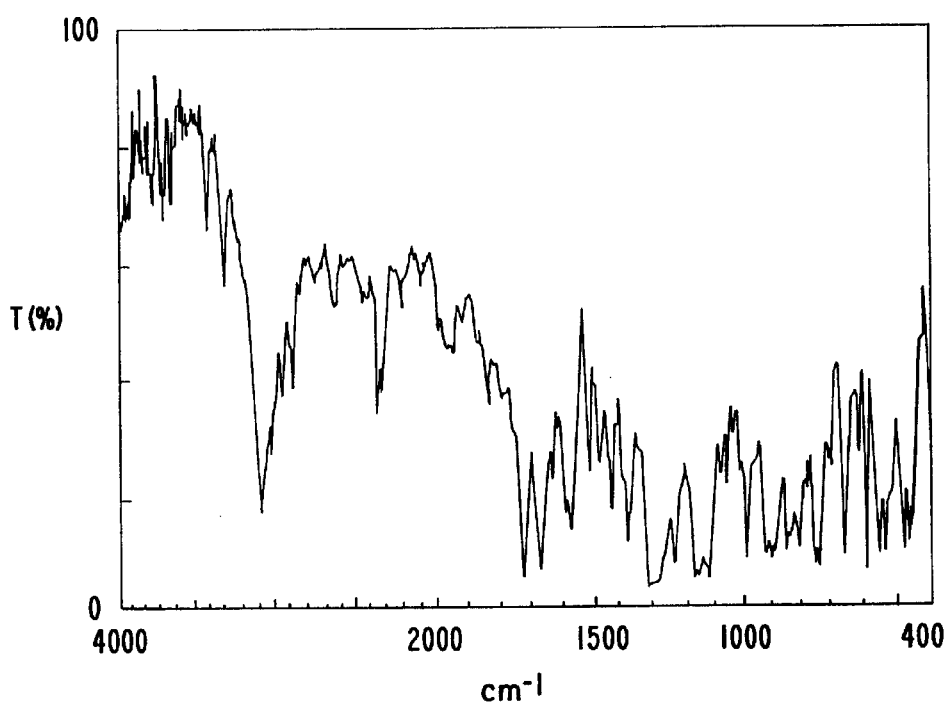
FIG. 2 is an IR spectrum of the thioxanthene derivative represented in FIG. 1.

The $^1$H-NMR and IR spectra of the product are given in FIG. 1 and FIG. 2, respectively. These spectra indicate that the product may be represented by the following formula (IX-1).

Element analysis: calculated (C: 68.30%, H: 3.99%); found (C: 67.65%, H: 4.16%)

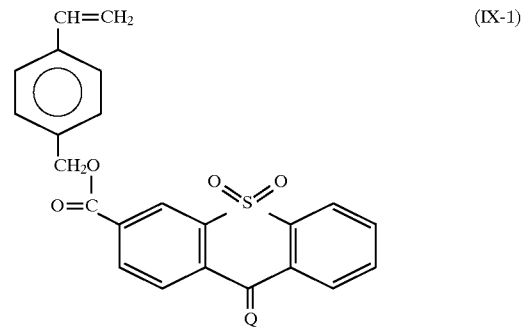

(IX-1)

EXAMPLE 2

2 g of the monomer obtained in Example 1 was dissolved in 5.05 ml of tetrahydrofuran (THF) to form a solution. Then, 0.016 g of azobisisobutyronitile (AIBN), as a polymerization initiator, was added to the solution to initiate a polymerization reaction. The polymerization reaction was carried out for 48 hours at 70° C. After completing the polymerization reaction, 300 ml of methanol was added to the reaction mixture. Then, the resultant mixture was filtered and purified to separate the product. The product yield was 74%.

Figure 3:
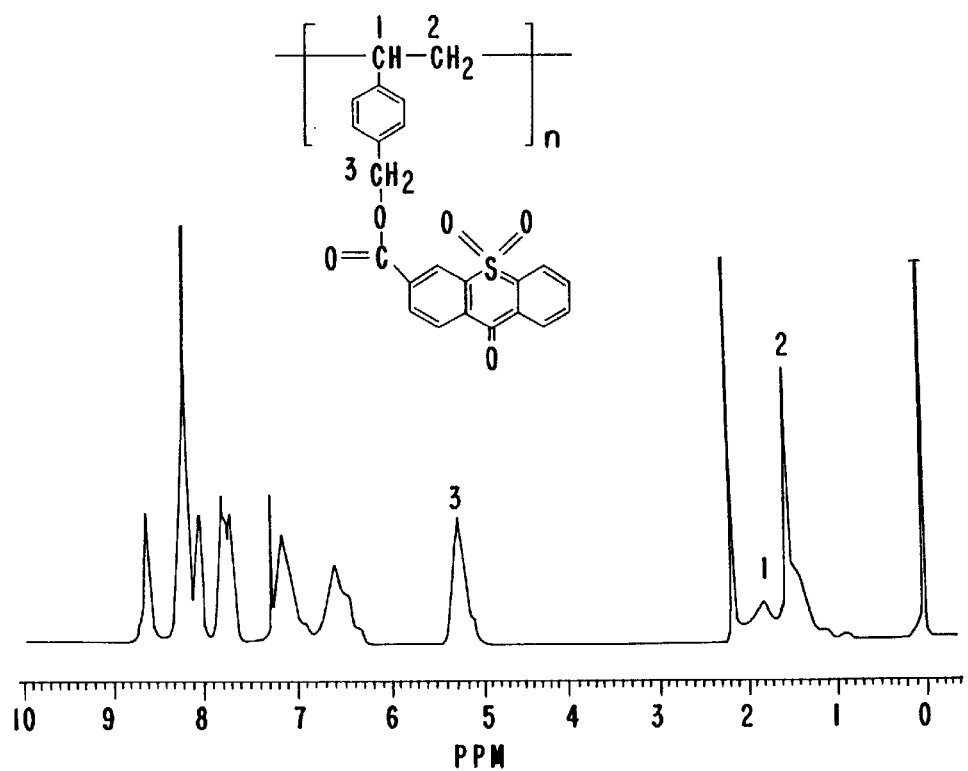
FIG. 3 is an $^1$H-NMR spectrum of a polymer manufactured using the thioxansen derivative represented in FIG. 1.
Figure 4:
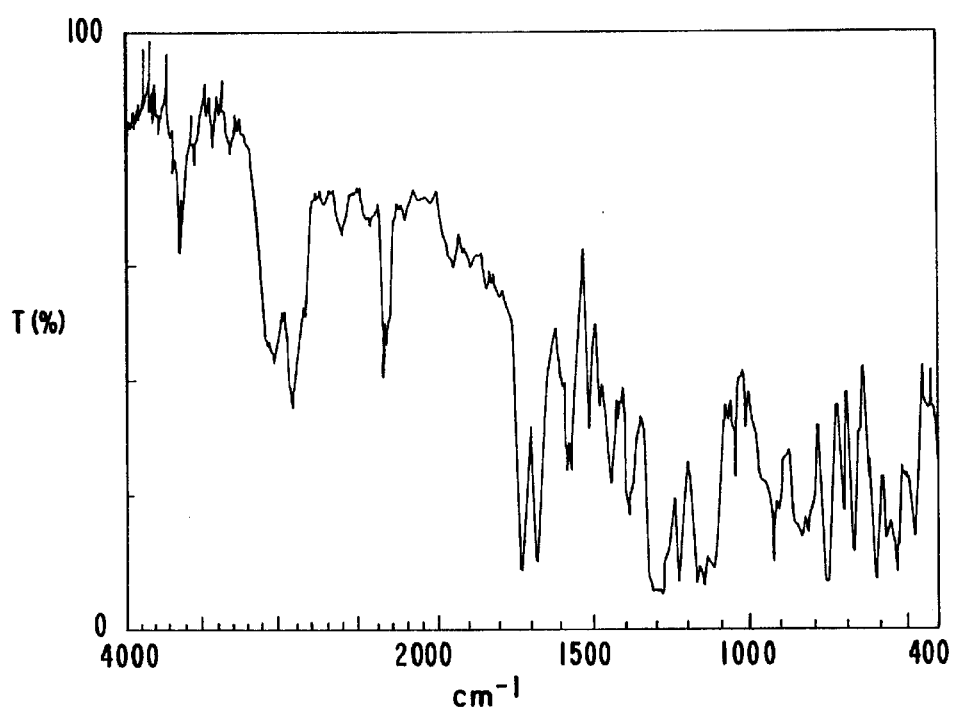
FIG. 4 is an IR spectrum of the polymer represented in FIG. 3.

The $^1$H-NMR and IR spectra of the product are shown in FIG. 3 and FIG. 4, respectively. These spectra indicate that the product may be a polymer represented by the following formula (X). The redox behavior of the obtained polymer was also measured (FIG. 5). As shown in FIG. 5, the polymer is characterized in that two cathodic peaks and two anodic peaks are observed and the shape of these peaks illustrates the behavior of a reversible reaction, and the first reduction electric potential is −0.8V, indicating a good electron transporting capacity of the polymer.

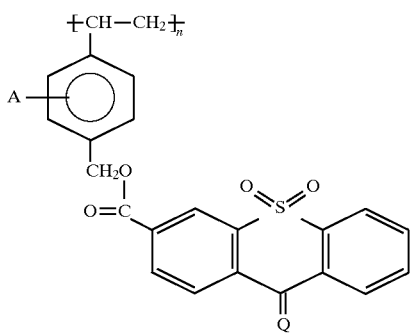

(X)

EXAMPLE 3

1.5 g of the monomer obtained in Example 1 and 0.55 g of n-butylmethacrylate were dissolved in 7.7 ml of tetrahydrofuran (THF) to form a solution. Then, 0.025 g of AIBN, as a polymerization initiator, was added to the solution to initiate polymerization reaction. The polymerization reaction was carried out for 48 hours at 70° C. After completing the polymerization, 300 ml of methanol was added to the reaction mixture. Then, the resultant mixture was filtered and purified to separate the product.

Figure 6:
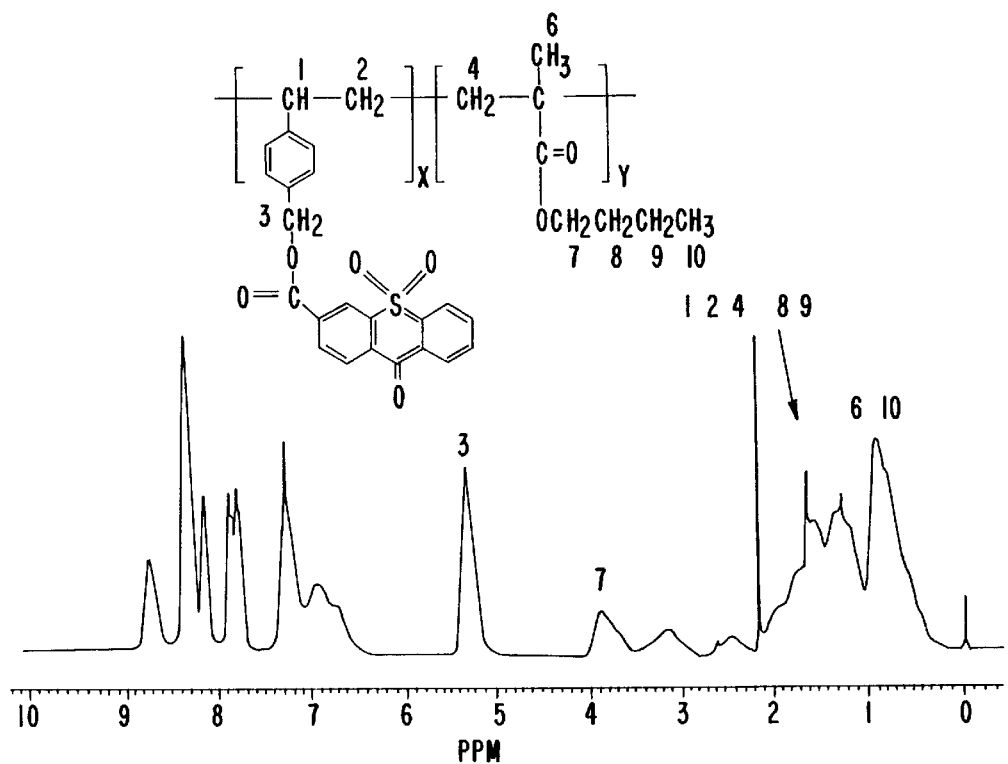
FIG. 6 and FIG. 7 are $^1$H-NMR spectra of respective copolymers manufactured using the thioxanthene derivative represented in FIG. 1 and other compounds.

The $^1$H-NMR spectrum of the product is given in FIG. 6. This spectrum indicates that the product may be a polymer represented by the following formula (XI). The redox behavior of the obtained polymer was also measured. According to the measurement results, the polymer is characterized in that two cathodic peaks and two anodic peaks are observed and the shape of these peaks illustrates the behavior of a reversible reaction, and the first reduction electric potential is −0.84V, indicating a good electron transporting capacity of the polymer.

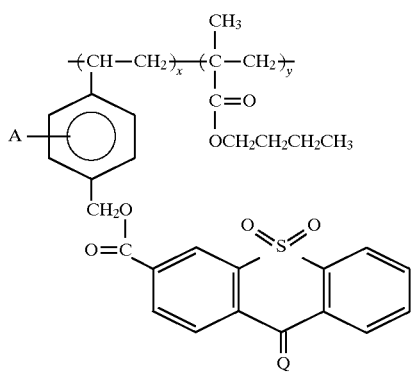

(XI)

EXAMPLE 4

1.5 g of the monomer obtained in Example 1 and 0.47 g of n-butylmethacrylate were dissolved in 7.7 ml of tetrahydrofuran (THF) to form a solution. Then, 0.025 g of AIBN, as a polymerization initiator, was added to the solution to initiate polymerization. The polymerization was carried out for 48 hours at 70° C. After completing the polymerization, 300 ml of methanol was added to the reaction mixture. Then, the resultant mixture was filtered and purified to separate the product.

Figure 7:
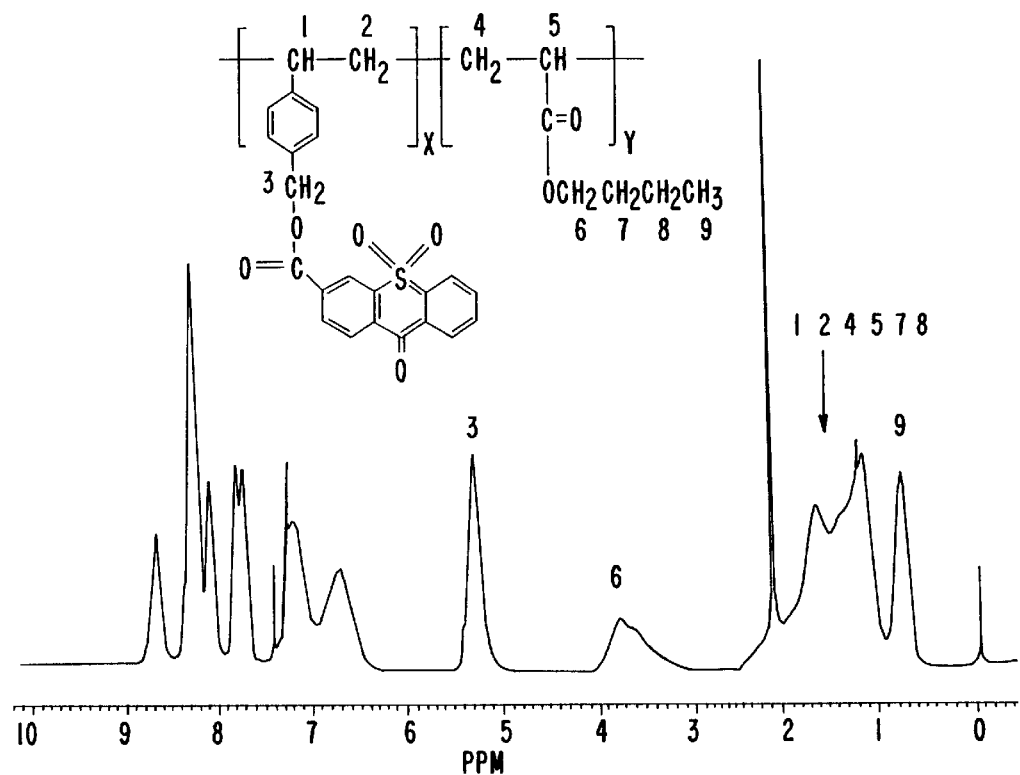

The $^1$H-NMR spectrum of the product is given in FIG. 7. This spectrum indicates that the product may be a polymer represented by the following formula (XII). The redox behavior of the obtained polymer was also measured. According to the measurement results, the polymer is characterized in that two cathodic peaks and two anodic peaks are observed and the shape of these peaks illustrates the behavior of a reversible reaction, and the first reduction electric potential is −0.82V, indicating a good electron transporting capacity of the polymer.

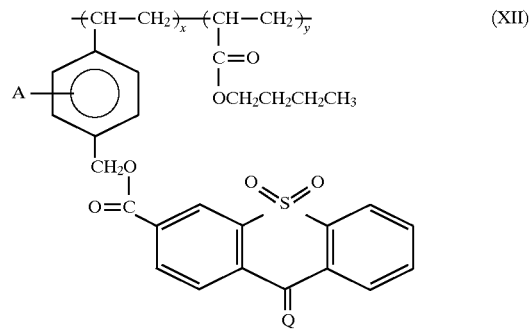

(XII)

As shown above, the polymer according to the present invention is suitable for use as a charge transporting material for a photo-conductive layer owing to its excellent electron transporting capacity as well as high solubility to a solvent and good compatibility with the binder polymer.

What is claimed is:

1. A polymer for a photo-conductive layer having a weight average molecular weight of 160,000 to 240,000 and represented by formula (I):

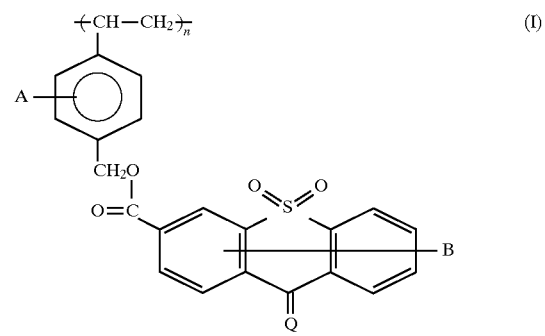

(I)

wherein A represents a hydrogen atom, a halogen atom, an alkyl group or an alkoxy group; B represents a hydrogen atom, a halogen atom, an alkyl group, an alkoxy group, a cyano group, a nitro group, an ester group or a trifluoromethyl group; Q represents an oxygen atom, $C(CN)_2$, $C(CO_2R)_2$, $C(CN)CO_2R$, $C(CN)COR$, $C(CN)COAr$, NCN or NAr, where R represents an alkyl group or an aryl group and Ar represents an aryl group; and n is 400 to 600.

2. A polymer comprising one kind of repeating unit represented by formula (II) and at least one kind of repeating unit selected from the group consisting of the following formulas (III), (IV), (V) and (VI), and having a weight average molecular weight of 80,000 to 500,000:

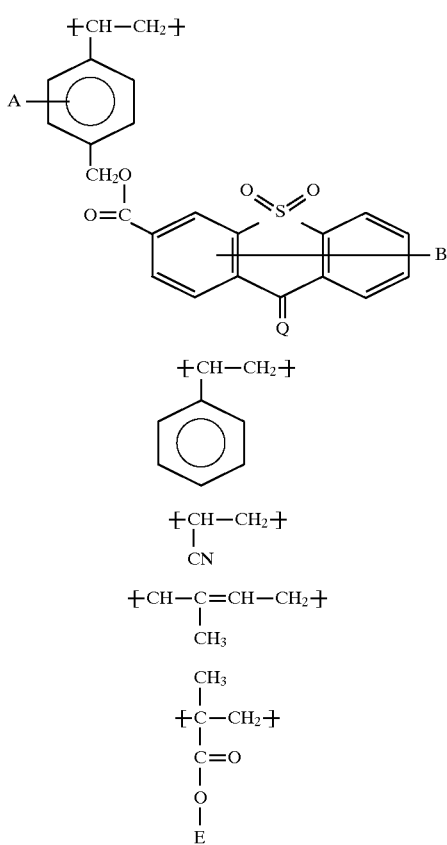

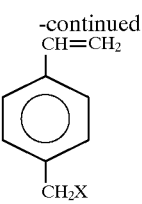

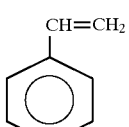

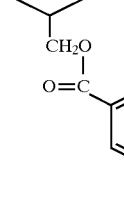

wherein, in formula (II), A represents a hydrogen atom, a halogen atom, an alkyl group or an alkoxy group; B represents a hydrogen atom, a halogen atom, an alkyl group, an alkoxy group, a cyano group, a nitro group, an ester group or a trifluoromethyl group; and Q represents an oxygen atom, $C(CN)_2$, $C(CO_2R)_2$, $C(CN)CO_2R$, $C(CN)COR$, $C(CN)COAr$, NCN or NAr, where R represents an alkyl group or an aryl group and Ar represents an aryl group; and, in formula (VI), E represents an alkyl group.

3. A polymer for a photo-conductive layer as claimed in claim 2, wherein the content of said repeating unit represented by formula (II) is 1 to 2 mole %, based on the total moles of the repeating units.

4. A preparation method of a polymer for a photo-conductive layer comprising the steps of:
adding thioxansen derivative represented by formula (VII) and styrene derivative represented by formula (VIII) to a first organic solvent in the same molar amount, adding an acid scavenger, and then reacting the reaction mixture, to thereby prepare a monomer represented by (IX);

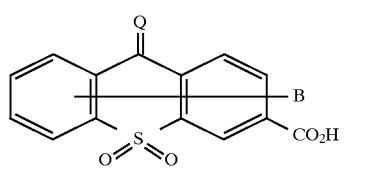

wherein A represents a hydrogen atom, a halogen atom, an alkyl group or an alkoxy group; B represents a hydrogen atom, a halogen atom, an alkyl group, an alkoxy group, a cyano group, a nitro group, an ester group or a trifluoromethyl group; and Q represents an oxygen atom, $C(CN)_2$, $C(C_2R)_2$, $C(CN)CO_2R$, $C(CN)COR$, $C(CN)COAr$, NCN or NAr, where R represents an alkyl group or an aryl group and Ar represents an aryl group; and adding said monomer into a second organic solvent and then adding a polymerization initiator, to thereby polymerize said monomer.

5. A preparation method of a polymer for a photo-conductive layer as claimed in claim 4, wherein at least one monomer selected from the group consisting of styrene, acrylonitrile, isoprene, acrylic ester and methacrylic ester is further added to said second organic solvent in an amount of 1 to 2 mole %, based on said monomer represented by formula (IX).

6. A preparation method of a polymer for a photo-conductive layer as claimed in claim 5, wherein said first organic solvent is dimethylformamide.

7. A preparation method of a polymer for a photo-conductive layer as claimed in claim 5, wherein said acid scavenger is sodium hydrogen carbonate.

8. A preparation method of a polymer for a photo-conductive layer as claimed in claim 5, wherein said second organic solvent is tetrahydrofuran.

9. A preparation method of a polymer for a photo-conductive layer as claimed in claim 5, wherein said polymerization initiator is azoisobutyronitile.

10. A preparation method of a polymer for a photo-conductive layer as claimed in claim 4, wherein said first organic solvent is dimethylformamide.

11. A preparation method of a polymer for a photo-conductive layer as claimed in claim 4, wherein said acid scavenger is sodium hydrogen carbonate.

12. A preparation method of a polymer for a photo-conductive layer as claimed in claim 4, wherein said second organic solvent is tetrahydrofuran.

13. A preparation method of a polymer for a photo-conductive layer as claimed in claim 4, wherein said polymerization initiator is azoisobutyronitile.

* * * * *